(12) United States Patent
Becker et al.

(10) Patent No.: US 11,695,743 B2
(45) Date of Patent: Jul. 4, 2023

(54) CONNECTING AND RESETTING DEVICES

(71) Applicant: Izuma Tech, Inc., Evant, TX (US)

(72) Inventors: Hanno Becker, Cambridge (GB); Hannes Tschofenig, Cambridge (GB)

(73) Assignee: Izuma Tech, Inc., Evant, TX (US)

( * ) Notice: Subject to any disclaimer, the term of this patent is extended or adjusted under 35 U.S.C. 154(b) by 7 days.

(21) Appl. No.: 17/306,466

(22) Filed: May 3, 2021

(65) Prior Publication Data
US 2021/0352058 A1 Nov. 11, 2021

(30) Foreign Application Priority Data
May 6, 2020 (GB) ...................................... 2006721

(51) Int. Cl.
| | | |
|---|---|---|
| *H04L 29/06* | (2006.01) | |
| *H04L 12/24* | (2006.01) | |
| *H04L 9/40* | (2022.01) | |
| *H04L 41/0604* | (2022.01) | |

(52) U.S. Cl.
CPC ........ *H04L 63/061* (2013.01); *H04L 41/0627* (2013.01); *H04L 63/0435* (2013.01); *H04L 63/20* (2013.01)

(58) Field of Classification Search
CPC ............... H04L 63/061; H04L 41/0627; H04L 63/0435; H04L 63/20
See application file for complete search history.

(56) References Cited

U.S. PATENT DOCUMENTS

| | | | | |
|---|---|---|---|---|
| 11,166,269 | B2* | 11/2021 | Yi ........................ | H04W 28/20 |
| 11,246,059 | B2* | 2/2022 | Shreevastav .......... | H04W 28/06 |
| 11,246,122 | B2* | 2/2022 | Ye .......................... | H04L 5/001 |
| 11,252,628 | B2* | 2/2022 | Wu .................... | H04W 36/0066 |
| 11,317,331 | B2* | 4/2022 | Ozturk ................. | H04W 36/30 |
| 11,323,360 | B2* | 5/2022 | Joseph .................... | H04L 47/34 |
| 11,382,007 | B2* | 7/2022 | Nagaraja ........... | H04W 74/0833 |
| 11,388,774 | B2* | 7/2022 | Zhou ..................... | H04L 5/0053 |
| 11,445,491 | B2* | 9/2022 | Liu ....................... | H04L 5/0053 |
| 2019/0132857 | A1* | 5/2019 | Babaei .............. | H04W 72/0453 |
| 2019/0149421 | A1* | 5/2019 | Jin ........................ | H04W 72/23 |
| | | | | 370/331 |

(Continued)

OTHER PUBLICATIONS

"Security, Privacy, and Anonymity in computation, communication, and storage,", Wang et al., 2016 (Year: 2016).*

(Continued)

*Primary Examiner* — Yonas A Bayou
(74) *Attorney, Agent, or Firm* — Leveque Intellectual Property Law, P.C.

(57) ABSTRACT

A computer implemented method for managing a connection between a device and a server resource, the method comprising: establishing the connection between the device and a first server of the server resource; registering a connection identifier relating to the connection between the device and the first server in a first database entry of a database arrangement; pre-computing, at the first server, an encrypted alert for the device, the alert being provided with a pre-defined future communication sequence number; and transmitting the alert from the first server to the database arrangement for storage in association with the first database entry of the database arrangement.

20 Claims, 9 Drawing Sheets

(56) References Cited

U.S. PATENT DOCUMENTS

2019/0199503 A1* 6/2019 Son .................. H04L 1/1854
2019/0364602 A1* 11/2019 Yi ................... H04W 74/0833

OTHER PUBLICATIONS

"Distributing and Preventing Late-Packet Covert Communication Using Sequence Number Tracking.", Fahimeh et al., 2013 (Year: 2013).*

"Device Discovery and Configuration Scheme for Internet of Things.", Ashraf et al., 2016 (Year: 2016).*

* cited by examiner

US 11,695,743 B2

CONNECTING AND RESETTING DEVICES

CROSS-REFERENCE TO RELATED APPLICATIONS

This application claims priority pursuant to 35 U.S.C. 119(a) of United Kingdom Patent Application No. 2006721.1, filed May 6, 2020, which application is incorporated herein by reference in its entirety.

FIELD OF THE INVENTION

The present techniques generally relate to connecting and resetting devices. More particularly, the techniques relate to connecting devices to server resources using long lived remote device connections and providing alerts for resetting long lived remote device connections. In particular, the techniques may be particularly applicable to the connection of resource constrained devices.

BACKGROUND

Cloud computing services are becoming more common. More and more devices are being connected to the cloud, for example as part of the "Internet of Things" (IoT). Such devices may be resource constrained devices. For example, relatively small devices such as temperature sensors, healthcare monitors and electronic door locks can be connected to the cloud so that they can be accessed and controlled using remote systems. For example, a door may be remotely opened from a remote platform, or data from a temperature sensor or healthcare monitor may be aggregated at a remote location and accessed from another device. Hence, there is an increasing amount of data being collected by cloud platforms and their providers.

Establishing a secure connection to a highly resource constrained device can be both time consuming and power consuming due to the complexity of the public key cryptography involved in establishing such a secure connection. The establishment or re-establishment of a connection to such devices may be periodically required following a loss of the connection, such as during failure of a component of the communication system, or if the device goes to sleep or is inactive for a set and/or predetermined period of time.

It would therefore be desirable to provide an alternative system.

SUMMARY OF THE INVENTION

According to a first aspect of the present technique, there is provided a computer implemented method for managing a connection between a device and a server resource, the method comprising: establishing the connection between the device and a first server of the server resource; registering a connection identifier relating to the connection between the device and the first server in a first database entry of a database arrangement; pre-computing, at the first server, an encrypted alert for the device, the alert being provided with a pre-defined future communication sequence number; and transmitting the alert from the first server to the database arrangement for storage in association with the first database entry of the database arrangement.

According to a second aspect of the present technique, there is provided a server resource comprising a processor configured to: establish a connection to a device; register a connection identifier relating to the connection between the device and the server resource in a first database entry of a database arrangement; pre-compute an encrypted alert for the device, the alert being provided with a pre-defined future communication sequence number; and transmit the alert to the database arrangement for storage in association with the first database entry of the database arrangement.

As will be appreciated by one skilled in the art, the present techniques may be embodied as an apparatus, a system, a method or a computer program. Accordingly, present techniques may take the form of an entirely hardware embodiment, an entirely software embodiment, or an embodiment combining software and hardware aspects.

BRIEF DESCRIPTION OF THE DRAWINGS

Embodiments will now be described with reference to the accompanying figures of which.

DETAILED DESCRIPTION OF THE INVENTION

Reference is made in the following detailed description to the accompanying drawings, wherein like numerals may designate like parts throughout that are corresponding and/or analogous. It is to be understood that other embodiments may be utilized. Furthermore, structural and/or other changes may be made without departing from claimed subject-matter.

The accompanying drawings and following description provide details of the present techniques for managing, that is, initiating and/or resetting, a connection between a device and a server resource.

Figure 1A:
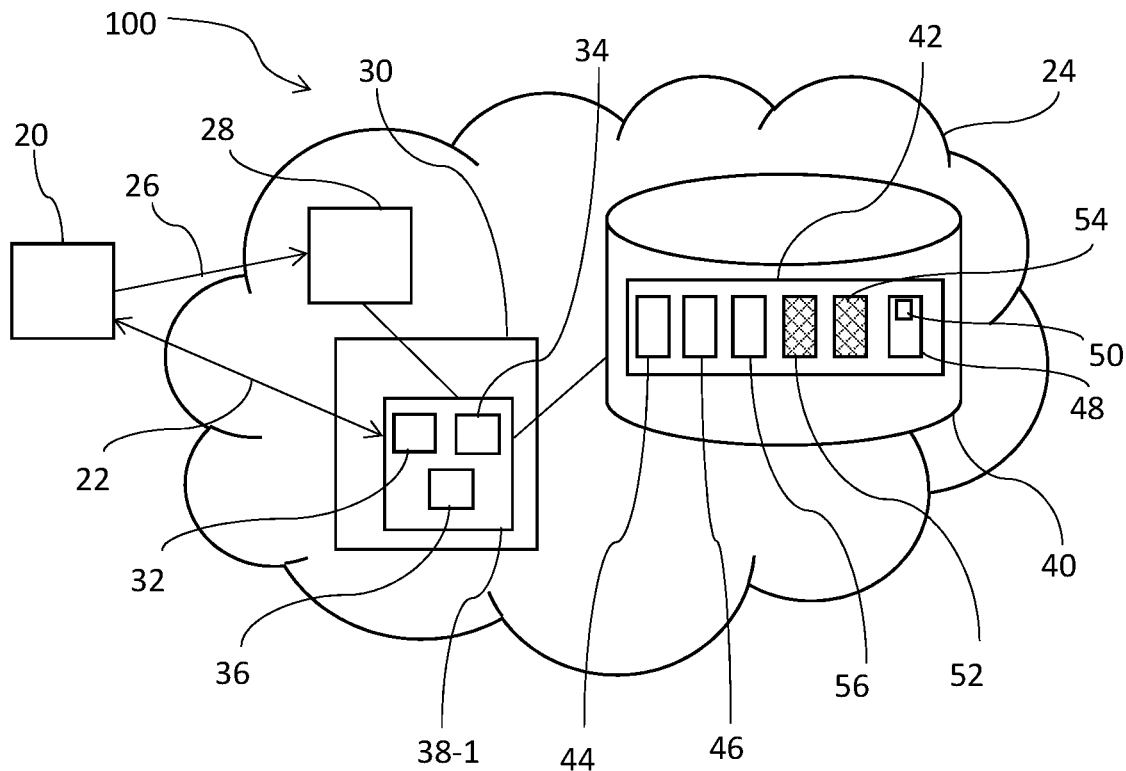
FIG. 1A illustrates an example initial connection scenario for a device according to the present techniques.

FIG. 1A shows an initial connection setup or deployment scenario 100 for a device 20 according to the present techniques. In the arrangement of the system for deployment of the device 20, there is a server resource 30 comprising processing means 32. The processing means 32 may comprise a processor such as provided by processing circuitry. The server resource further comprises storage means in the form of data storage 34, which may be a volatile memory, and communication means 36 such as provided by communication circuitry, which may include input circuitry and output circuitry. The server resource 30 is configured to establish a connection 22 to the device 20.

Further, the server resource 30 is configured to register a connection identifier 46 relating to the connection 22 between the device 20 and the server resource 30 in a first database entry 42 of a database arrangement 40. The server resource 30 may, for example, comprise a first server or service instance. Therefore, the server resource 30 transmits data relating to the connection identifier 46 to the database arrangement 40 for storage therein.

The database arrangement 40 may be a database system comprising a distributed database arrangement, where data relating to or associated with the connection 22 between the device 20 and the server resource 30 may be stored across different physical locations, across different databases, and/or in different database entries across different databases. Alternatively, the database arrangement 40 may comprise a single database, where data relating to or associated with the connection 22 between the device 20 and the server resource 30 may be stored in the same or different database entries.

The server resource 30 is then configured to pre-compute an alert 48 for the device 20, the alert 48 being provided with a pre-defined future communication sequence number 50, which may be for example the highest possible future communication sequence number or a generally high numbered future communication sequence number. The server resource 30 is also configured to transmit the alert 48 to the database arrangement 40 for storage in association with the first database entry 42 of the database arrangement 40. The operation of the server resource 30, and in particular servers 38 of the server resource 30 are explained below further in relation to the accompanying drawings.

FIG. 1A illustrates connection of various system components. In particular the system comprises a device 20, a service resource 30, and a database arrangement 40. Operation of the system components is explained below further in relation to the accompanying drawings. The system may perform the blocks of any hereinafter described method.

Figure 1B:
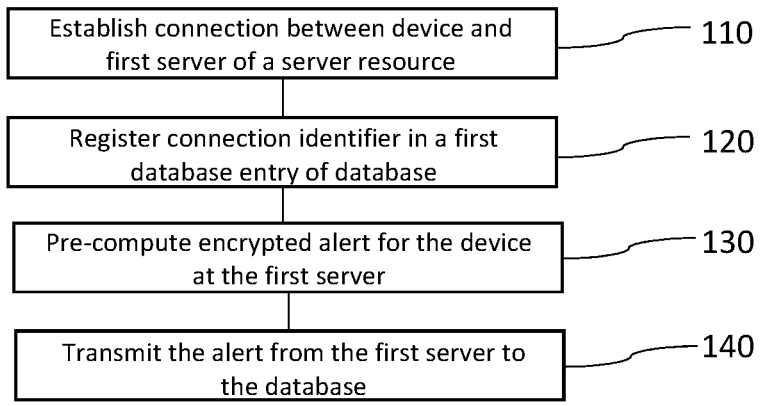
FIG. 1B illustrates a flow diagram of blocks of a method according to various examples.

FIG. 1B details the blocks of a computer implemented method for managing a connection between a device 20 and a server resource 30.

When a device 20, such as a remote device, is connected to a distributed computing environment 24, for example a cloud computing environment, for the first time, an initial setup process is required whereby the device 20 requests connection to a server resource 30 within the distributed computing environment 24.

The server resource 30 may comprise a plurality of interconnected computing devices (or software running on a plurality of interconnected devices), whereby the plurality of interconnected computing devices may be distributed over one or more public and/or private networks. The server resource 30 may provide servers 38, which may comprise a first service instance or server 38-1. The server resource 30 may provide a plurality of service instances or servers 38-1, 38-2, 38-3, 38-4.

The distributed computing environment 24 may comprise, or be separately connected or connectable to, a database 40. The database may be a centralised database or a database arrangement 40, which may be a single or a distributed database arrangement 40, and may be configured to store connection material for, relating to, or associated with, devices 20 and/or their connection to the distributed computing environment 24. In embodiments, the connection material comprises a connection identifier 46, or connection ID (CID), such as a connection identifier 46 relating to a datagram transport layer security (DTLS) connection.

The establishing of a connection 22 between the device 20 and a first server 38-1 may comprise sending, or forwarding, a connection request 26 from the device 20 to a router resource 28, such as a load balancer 28 of the distributed computing environment 24, wherein the load balancer 28 sends, or forwards, the connection request 26 to a server 38 of a server resource 30 which is capable of communicating, or establishing communication, with the device 20 in this case the first server 38-1. Of course it will be understood that the connection request 26 from the device 20 may be modified in any suitable way at the load balancer 28 in order to be in a format recognisable or useable by the selected server 38 of the server resource 30.

FIG. 1A illustrates an example initial connection scenario 100 for a device 20 that is to be connected to the distributed computing environment 24 once the connection request 26 has been forwarded to the first server 38-1.

FIG. 1B illustrates a flow diagram of blocks for the initial connection scenario 100 of FIG. 1A.

At block 110, a connection between a device 20 and a first server 38-1 of a server resource 30 is established. The first server 38-1 may set up a connection 22 between the first server 38-1 and the device 20. This may be called a device-server connection. The connection 22 may be a secure connection requiring security parameters to serve the device 20. The security parameters may be generated using an authentication key exchange protocol.

A connection identifier 46, may be assigned to the connection 22. The connection identifier 46 may allow the device-service connection 22 to be retained even if underlying transport characteristics such as internet protocol (IP) and port change.

The device 20 may use one or more security protocols to authenticate with a server resource 30 (e.g. a server, service instance, microservice, etc.), whereby the device 20 may use an authentication key exchange protocol to mutually authenticate with a server resource 30 and to negotiate/generate security parameters required to secure communications between the device 20 and the server resource 30.

In embodiments of the invention, the authentication key exchange protocol may comprise transport layer security or datagram transport layer security such that the authentication key exchange protocol may be a respective transport layer security or datagram transport layer security handshake to allow the device 20 and a server resource 30 to establish secure communications between one another. In other embodiments any suitable authentication key exchange protocol may be used to allow the device 20 and a server resource 30 to establish secure communications between one another.

The server resource 30 may provide a connection identifier 46 to the device 20 during the handshake, whereby the connection identifier 46 is an identifier (e.g. comprising one or more bytes) carried in a message from the device 20 that allows the server resource 30 to identify the corresponding security state, and therefore, the security parameters required to serve the device 20 during a secure communication session.

The use of a connection identifier 46 to provide a persistent identifier, to a device-server connection 22, in particular in the context of transport layer security or datagram transport layer security, allows the connection 22 to be retained even if the underlying transport characteristics such as internet protocol and port change, such that the lifetime of connections may be extended, therefore positively impacting the battery lifetime and reactivity of connected devices 20.

In particular, using datagram transport layer security and a connection identifier 46 allows a datagram transport layer security connection to be established once and then to persist for the lifetime of a device 20, with connection data being retained after the connection 22 is established as part of the connection material. The connection data comprises a key 52, which may be used in an authentication key exchange protocol when initiating communication between the device 20 and the server resource 30, as described further below.

The connection data may also comprise a message counter 54 which is used to track message sequencing or a communication sequence number for messages sent from the device 20. The connection data may also comprise meta-data for the connection data (e.g. algorithm identifier, sequence numbers, etc.). From the perspective of the provider of a distributed computing environment 24, the use of datagram transport layer security and a connection identifier 46 further allows for a reduction of the number of concurrent service instances or servers, as connection material for inactive devices 20 can be stored in a centralized database or database arrangement 40 and need only be picked up once a device 20 becomes active again.

At block 120 a connection identifier 46 relating to the connection 22 between the device 20 and the first server 38-1 is registered in a first database entry 42 of a database arrangement 40. That is, the first server 38-1 transmits data relating to the connection identifier 46 to the database arrangement 40 for storage therein.

At block 130 an encrypted alert 48 for the device 20 is pre-computed at the first server 38-1. In embodiments using datagram transport layer security such an encrypted alert 48 may be called a fatal alert. The alert 48 is provided with a pre-defined or pre-determined future communication sequence number 50. The pre-defined or pre-determined future communication sequence number 50 is allocated to be of a value that will allow the alert to remain valid irrespective of the stage of the communications between the device 20 and first server 38-1.

In some embodiments the future communication sequence number 50 is the highest possible future communication sequence number. In such embodiments all lower future communication sequence numbers may be used for regular data traffic. In one example, relating to a datagram transport layer security connection, the future communication sequence number 50 is $2^{24}-1$, or 0x00FFFFFF. Other embodiments may provide a possible range of future communication sequence numbers that can be used for the alert 48, which range may be an upper range of possible future communication sequence numbers that is not to be used for, or would not be expected to be used by, regular data traffic. The lowest value of the upper range may be larger than anything normally seen during communication between the device 20 and the first server 38-1 in order to avoid the alert 48 being considered to be old and therefore to be ignored by the device 20.

At block 140 the alert 48 is transmitted from the first server 38-1 to the database arrangement 40 for storage in association with the first database entry 42 of the database arrangement 40. That is, the first server 38-1 transmits data relating to the alert 48 to the database arrangement 40 for storage therein. The alert 48 for the device 20 is stored in association with the first database entry 42 of the database arrangement 40, which in some embodiments may be in the first database entry 42 itself. Therefore, the alert 48 may be stored as part of the first database entry 42 in the database arrangement 40, or in association with the first database entry 42 in the database arrangement 40, alongside the connection identifier 46.

The storing of the alert 48 for the device 20 may be carried out prior to any further communication between the first server 38-1 and the device 20. Thus, as will be described further below, a connection 22 between the device 20 and the first server 38-1 which is determined to require a reset, because for example it has a fault or because it is broken between the device 20 and the first server 38-1, for example due to failure of the first server instance 38-1, may be reset using the previously stored alert 48 for the device 20, which may be sent to the device 20 by a further server.

The database arrangement 40 may also store one or more of a device identifier 44 and a server identifier 56 for the first server 38-1. The device identifier 44 and/or the server identifier 56 may form part of the connection material. The device identifier 44 and/or server identifier 56 may be stored in association with the first database entry 42 of the database arrangement 40 or as part of the first database entry 42 of the database arrangement 40, and may be used to identify to which device 20 and/or server 38 the connection identifier 46 pertains.

The database arrangement 40 is also configured to store connection data in the format of a key 52, keys, or key information, which is used in the authentication key exchange protocol when initiating communication between the device 20 and the first server 38-1, however, the key 52 is not stored in the database arrangement 40 until the device 20 becomes inactive or sleeps and the communication with the first server 38-1 ends, illustrated by the crossed box in FIG. 1A. The connection data also includes a counter 54. The counter 54 identifies the current message sequence number. However, the counter 54 is not stored in the database arrangement 40 until the device 20 becomes inactive or sleeps and the communication with the first server 38-1 ends, illustrated by the crossed box in FIG. 1A. The key 52 and counter 54 may be stored in association with the first database entry 42 of the database arrangement 40 or as part of the first database entry 42.

In order to maintain system security the connection data is never duplicated between any servers 38-1, 38-2, 38-3, 38-4 and the database arrangement 40. Connection data, including keys 52 and message counters 54, must be cleared from the database arrangement 40 when a device 20 is being served.

If a server 38 crashes or fails while serving a device 20, the distributed computing environment 24 loses the connection data irrevocably because it is stored in volatile memory 34 of the server 38. Moreover, since the connection 22 is no longer tied to the underlying transport, the device 20 will not notice the loss of connection 22, and further the device 20 may silently ignore invalid messages (as part of a DoS defence).

Therefore since there is persistent communication between the device 20 and the first server 38-1 and the key 52 only exists in volatile memory 34 of the first server 38-1 and is not sent to, or stored in, the database arrangement 40, failure of the first server 38-1 could lead to control of the device 20 being lost either permanently or for a significant period of time until the device 20 is able to recover communications via, for example, a timeout procedure. Even if the device 20 implements a timeout mechanism, it will be unreachable for some period of time until that timeout triggers. The present mechanism, described in more detail below, allows the server resource 30 to inform the device 20 about the connection termination immediately, thus enabling re-establishment of connectivity without delay.

Figure 2A:
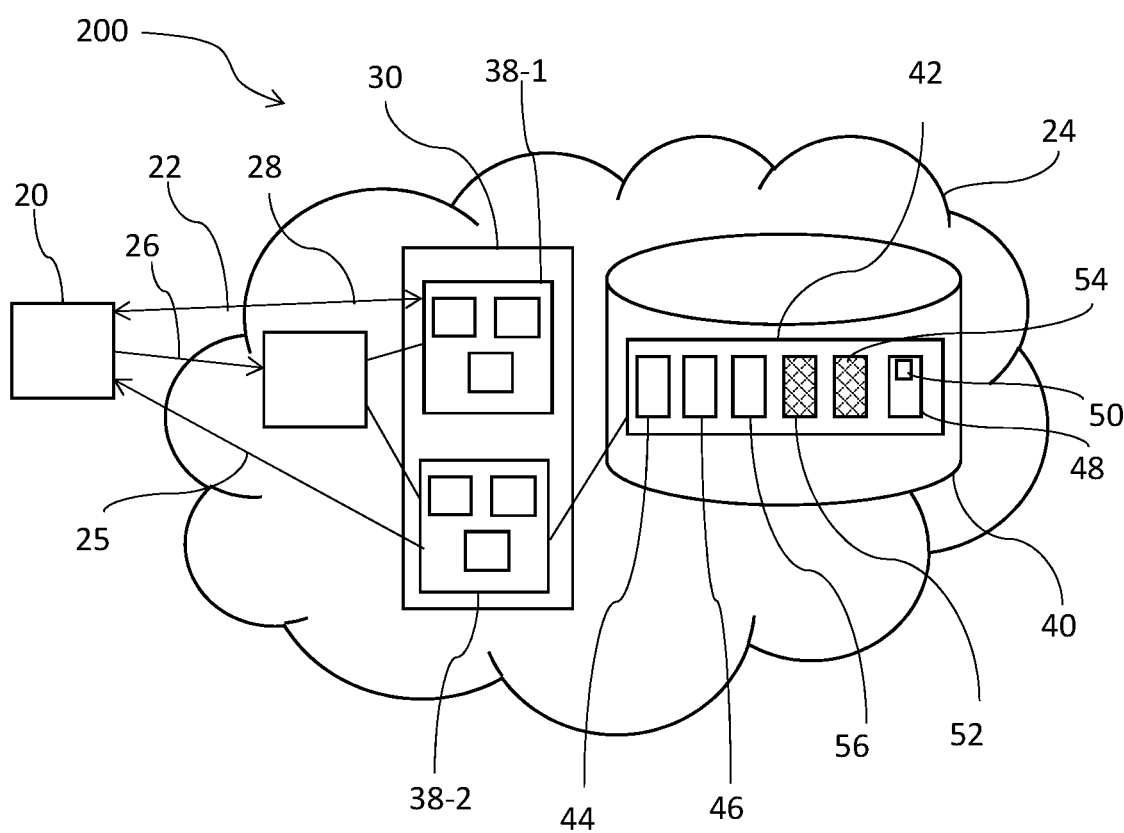
FIG. 2A illustrates an example of resetting a device connection according to the present techniques.
Figure 2B:
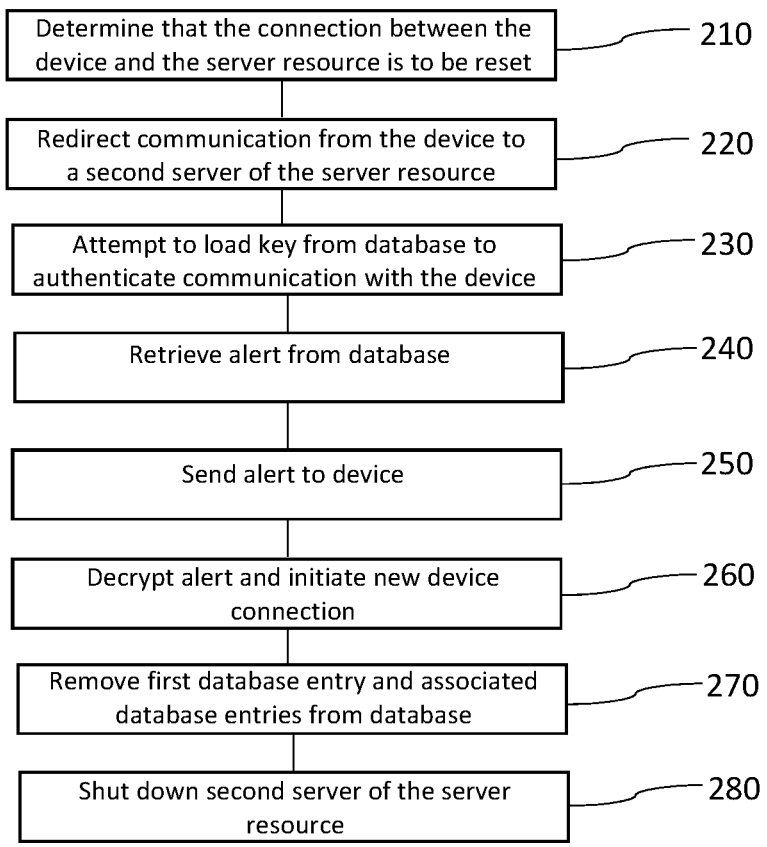
FIG. 2B illustrates a flow diagram of blocks of a method according to various examples.

The previously stored alert 48 can be used to recover the device 20 upon transmission or receipt of the next communication from the device 20 to the first server 38-1. FIG. 2A illustrates an example of a device connection reset scenario 200 and FIG. 2B illustrates a flow diagram of blocks for the device connection reset scenario 200 of FIG. 2A.

At block 210, following storing of the alert 48 for the device 20 in the database arrangement 40, it is determined that the connection between the device 20 and the server resource 30 is to be reset.

Determining that the connection 22 between the device 20 and the server resource 30 is to be reset may be enabled, for example, by detecting failure of the first server 38-1. The detection of the failure of the first server 38-1 can be identified by, for example, a communication 22 to the first server 38-1 failing to reach the first server 38-1.

Determining that the connection 22 between the device 20 and the server resource 30 is to be reset may comprise determining that connection data for establishing the connection between the device 20 and the first server 38-1 of the server resource 30 has been lost.

In order to restore communication with the device 20 it is necessary to access the database arrangement 40 to retrieve the previously stored alert 48. When detection of the requirement to reset the connection between the device 20 and the server resource 30, for example by detecting loss of connection data or failure of the first server 38-1, has been identified, the communication from the device 20 is redirected to a second server 38-2 of the server resource 30 in block 220, and because the first server 38-1 is no longer available, the accessing of the database arrangement 40 is by the second server 38-2, the second server 38-2 being different from the first server 38-1.

The redirection of the communication from the device 20 to the second server 38-2 is facilitated by the load balancer 28 which can distribute tasks over the server resource 30. The load balancer 28 receives the communication from the device 20 and reroutes the message to an appropriate destination, the destination being an available server 38, in this case a second server 38-2.

When the second server 38-2 receives the redirected communication from the device 20 it attempts, in block 230, to load the key 52 from the database arrangement 40, which is stored in association with the first database entry 42 of the database arrangement 40, in order to authenticate communication with the device 20. Since the first server 38-1 did not shut down in a controlled manner, the key 52 is not held on the database arrangement 40, as indicated by the crossed box in FIG. 2A, and so retrieval of such a key 52 fails. The second server 38-2 then concludes that the first server 38-1 must have shut down in an uncontrolled manner, failed in an unexpected manner, crashed, or is unavailable for some other reason.

Following failure to retrieve the key 52, the database arrangement 40 is then accessed by the second server 38-2 at block 240 to retrieve or fetch the alert 48.

Once the alert 48 is retrieved then the alert 48 is sent, via a device-server connection 25, to the device 20 in block 250. In particular the alert 48 is sent to the device 20 from the second server 38-2, in response to the failure of the first server 38-1.

Figure 3A:
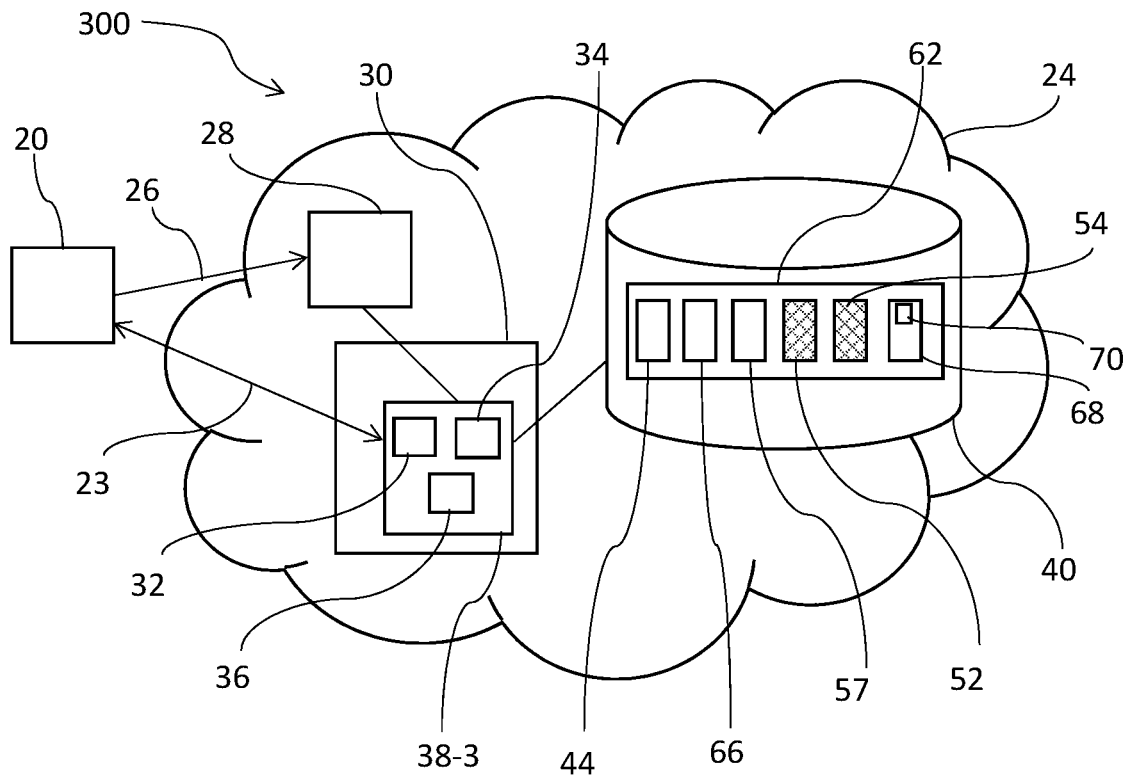
FIG. 3A illustrates an example connection restart scenario for a device according to the present techniques.

In block 260 a new device connection 23, illustrated in FIG. 3A, is started, as will be explained further below. At this time the first database entry 42 and associated database entries are removed from the database arrangement 40 in block 270 and the second server 38-2 is shut down in block 280, following the sending of the alert 48 to the device 20 from the second server 38-2. Blocks 260 and 280 may operate in parallel.

Figure 3B:
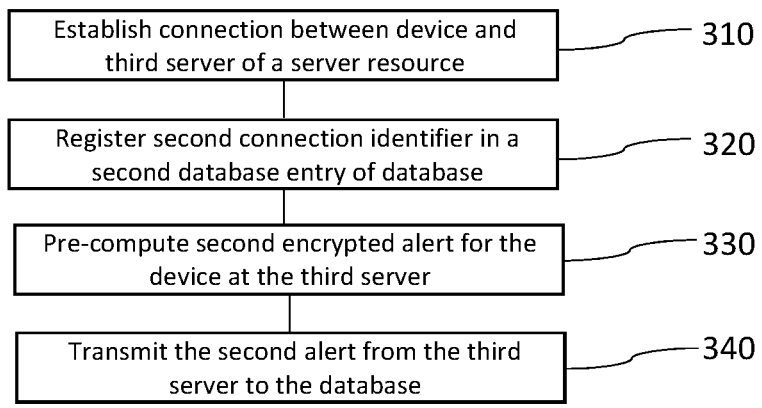
FIG. 3B illustrates a flow diagram of blocks of a method according to various examples.

In relation to block 260, the alert 48, received from the second server 38-2, is decrypted at the device 20. The initiation of the new device connection 23 is then similar to the initial connection setup described above in relation to communicating with the first server 38-1, and is illustrated in FIG. 3A, which illustrates an example connection restart scenario 300, and FIG. 3B which illustrates a flow diagram of blocks for the connection restart scenario 300 of FIG. 3A.

In particular, in response to decrypting the alert 48, a new connection 23 between the device 20 and a third server 38-3 of the server resource 30 is established at block 310. Then, at block 320, a second connection identifier 66 relating to the connection 23 between the device 20 and the third server 38-3 is registered in a second database entry 62 of the database arrangement 40 i.e. the third server 38-3 transmits data relating to the second connection identifier 66 to the database arrangement 40 for storage therein.

A new encrypted alert 68, which may be a second encrypted alert, for the device 20 is then pre-computed at block 330, at the third server 38-3, the second alert 68 being provided with a pre-defined future communication sequence number 70, as noted previously in relation to the previous alert 48.

Finally, the second alert 68 is transmitted at block 340, from the third server 38-3, to the database arrangement 40 for storage in association with the second database entry 62 of the database arrangement 40. Communication between the device 20 and the third server 38-3 may then continue.

The database arrangement 40 may also store one or more of a device identifier 44 and a server identifier 57 for the second server 38-2. The device identifier 44 and/or the server identifier 57 may form part of the connection material. The device identifier 44 and/or server identifier 57 may be stored in association with or as part of the second database entry 62 of the database arrangement 40, and may be used to identify to which device 20 and/or server 38 the second connection identifier 66 pertains.

As previously noted, the database arrangement 40 is also configured to store connection data in the format of a key 52, keys, or key information, which is used in the authentication key exchange protocol when initiating communication between the device 20 and, in this instance, the second server 38-2, however, the key 52 is not stored in the database arrangement 40 until the device 20 becomes inactive or sleeps and the communication with the second server 38-2 ends, illustrated by the crossed box in FIG. 3A. The connection data also includes a counter 54. The counter 54 identifies the current message sequence number. However, the counter 54 is not stored in the database arrangement 40 until the device 20 becomes inactive or sleeps and the communication with the second server 38-3 ends, illustrated by the crossed box in FIG. 3A. The key 52 and counter 54 may be stored in association with the second database entry 62 of the database arrangement 40 or as part of the second database entry 42.

Whilst the above embodiment describes the failure of the first server 38-1, which is the server 38 used in the initial connection setup, it will be understood that after a period of inactivity of the device 20, the first server 38-1 may shut down or go into a sleep mode. During this period of inactivity of the device 20, the first server 38-1 may be released from monitoring or managing the device 20. Subsequently, upon a further communication or message being sent from the device 20, a new server 38, for example a second server 38-2, is initiated and can continue the communication with the device 20. Therefore, in such circumstances, the failure mode described above for the active server 38 will relate to the loss of connection data for establishing the connection between the device 20 and the second server 38-2 of the server resource 30, or failure of the second server 38-2, such that it would be the loss of connection data for establishing the connection between the device 20 and the second server 38-2 of the server resource 30 or failure of the second server 38-2 that would be detected. The alert 48 would then be sent to the device 20 by a further new server 38, for example a third server 38-3.

As noted above, the database arrangement 40 is configured to store a key 52, keys, or key information, used in the authentication key exchange protocol when initiating communication between the device 20 and the first server 38-1, however, the key 52 is not stored in the database arrangement 40 until the device 20 becomes inactive or sleeps and the communication with the first server 38-1 ends, such that the first server 38-1 offloads the key 52 to the database arrangement 40. This is explained further below in relation to FIG. 4A which illustrates an example of a device inactivation scenario 400 and FIG. 4B which illustrates a flow diagram of blocks for the device inactivation scenario 400 of FIG. 4A.

Figure 4A:
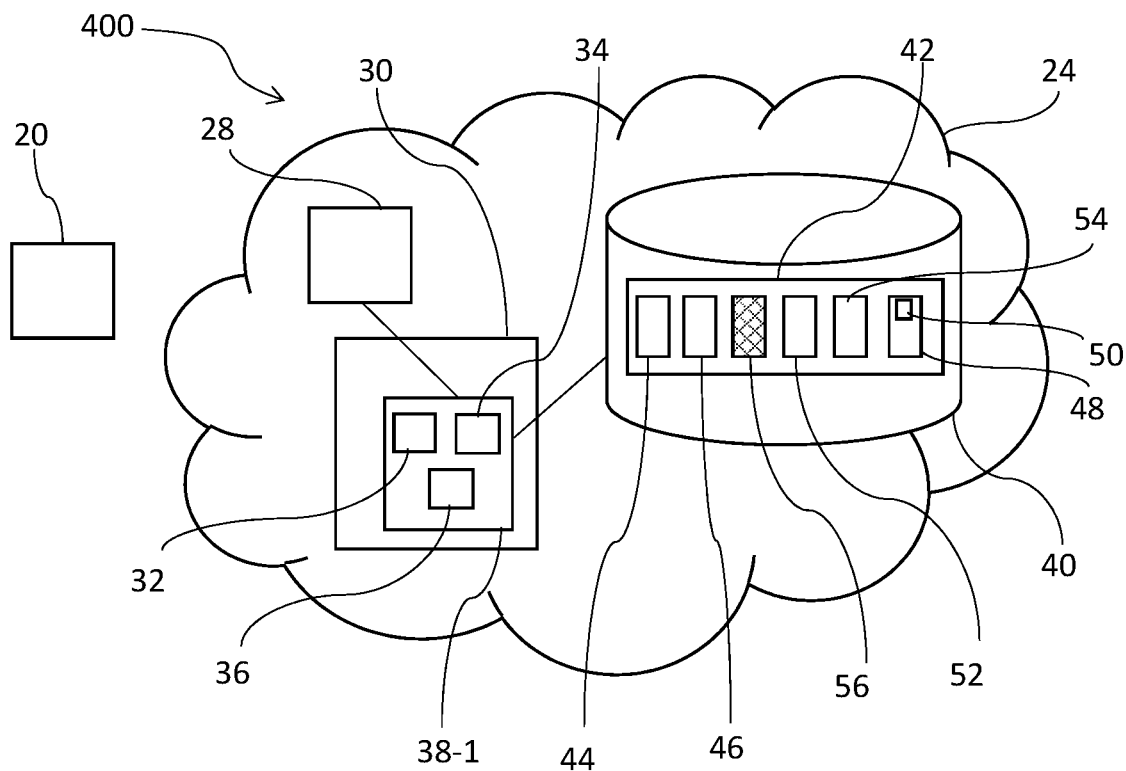
FIG. 4A illustrates an example of device deactivation according to the present techniques.
Figure 4B:
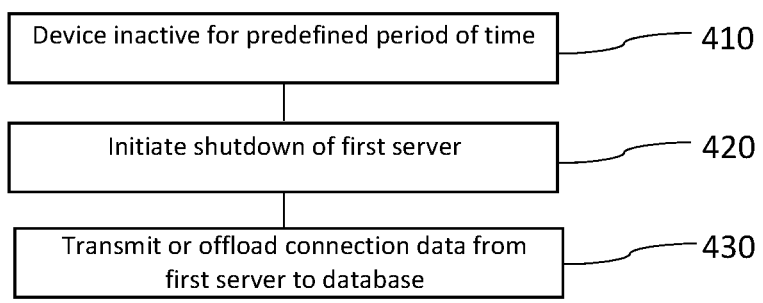
FIG. 4B illustrates a flow diagram of blocks of a method according to various examples.

In FIG. 4A it is clear that the communication between the device 20 and the first server 38-1 has already been established, as described above in relation to FIG. 1A and FIG. 1B.

At block 410 the device 20 becomes inactive for a predefined period of time. For example a threshold time may be set to define the predefined period of time. Following the predefined period of time, a shutdown of the first server 38-1 is initiated at block 420. In order for the first server 38-1 to shut down it is necessary to transmit or offload connection data from the first server 38-1 to the database arrangement 40 for storage in association with, or as part of, the first database entry 42 of the database arrangement 40, as shown in block 430. The connection data includes a key 52 and a counter 54. The counter 54 identifies the current message sequence number. Since the first server 38-1 is no longer communicating with device 20, its corresponding server identifier 56 is removed from the database arrangement 40, as illustrated by a crossed box in FIG. 4A.

Figure 5A:
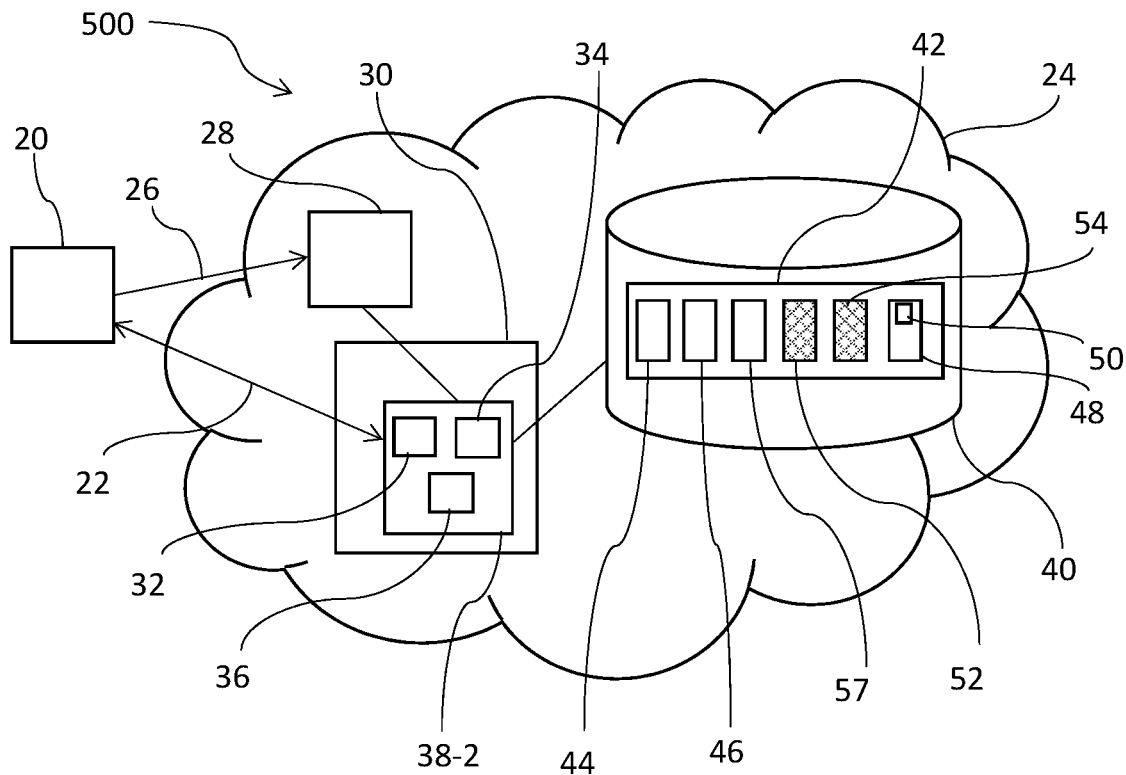
FIG. 5A illustrates an example of device re-activation according to the present techniques.
Figure 5B:
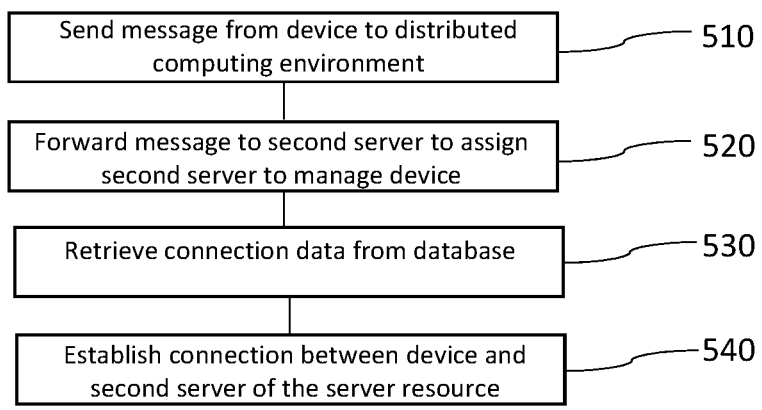
FIG. 5B illustrates a flow diagram of blocks of a method according to various examples.

Upon a further message being sent from the device 20, a new server 38, for example a second server 38-2, is initiated and can continue the communication 22 with the device 20. This is explained further below in relation to FIG. 5A which illustrates an example of a device re-activation scenario 500 and FIG. 5B which illustrates a flow diagram of blocks for the device re-activation scenario 500 of FIG. 5A.

At block 510 the device 20 sends a message 26, comprising a data packet including the connection identifier 46, to the distributed computing environment 24. The message is received from the device 20 at the distributed computing environment 24, in particular the message can be received by the load balancer 28. The load balancer 28 at the distributed computing environment 24 forwards the message to the second server 38-2, to assign, at block 520, the second server 38-2 to the management of the device 20.

At block 530 connection data is retrieved from the database arrangement 40. The connection data comprises the key 52 and counter data 54 to enable the second server 38-2 to continue the communication with the device 20 in place of the first server 38-1.

Once the security between the device 20 and second server 38-2 has been established using the key 52, the connection 22 between the device 20 and the second server 38-2 of the server resource 30 is established at block 540 and the device 20 will be able to communicate with the second server 38-2 and vice versa.

When the connection data is retrieved from the database arrangement 40, the connection data in the database arrangement 40 is removed or deleted. That is, the key 52 and counter 54 are removed or deleted from the database arrangement 40.

A server identifier 57 may be populated in association with, or as part of, the first database entry 42 of the database arrangement 40 to identify the second server 38-2.

The sequence of shutdown and restart of the servers 38 as described above and shown in FIGS. 4A, 4B, 5A, and 5B, can continue indefinitely. Some service instances or servers 38 may be reused in this process.

The connection data, comprising the key 52 and counter 54, must be removed from the database arrangement 40 when in use, as messages, in particular datagram transport layer security messages, have a sequence number, and it is vital to the operation of the datagram transport layer security that such sequence numbers do not repeat. Sequence numbers must monotonically increase in order to detect message replay, and therefore to maintain security of the communication with the device 20.

As previously noted, when precomputing an alert 48, a sequence number is chosen for the alert 48. Since the connection is only about to start at the time of precomputation of the alert 48, the next unused sequence number cannot be practically used as then sending the alert 48 later would lead to silent dismissal by the device 20 since its sequence number would be too old. Therefore a large future communication sequence number 50 is required, more precisely, one which is strictly larger than any sequence number potentially used in regular traffic, both for security and to prevent it from being dropped as an old message.

Similar to the embodiment described above in relation to determining that the connection 22 between the device 20 and the first server 38-1 is to be reset, for example because of loss of connection data and/or failure of the first server 38-1, in the situation where it is determined that the connection 22 between the device 20 and the second server 38-2 is to be reset, for example because of failure of the second server 38-2, the connection 22 may be reset using the previously stored alert 48 for the device 20, which may be sent to the device 20 by a further server 38. A failure of the second server 38-2 could lead to the device 20 being lost either permanently or for a significant period of time until the device 20 is able to recover communications via, for example, a timeout procedure.

Figure 6A:
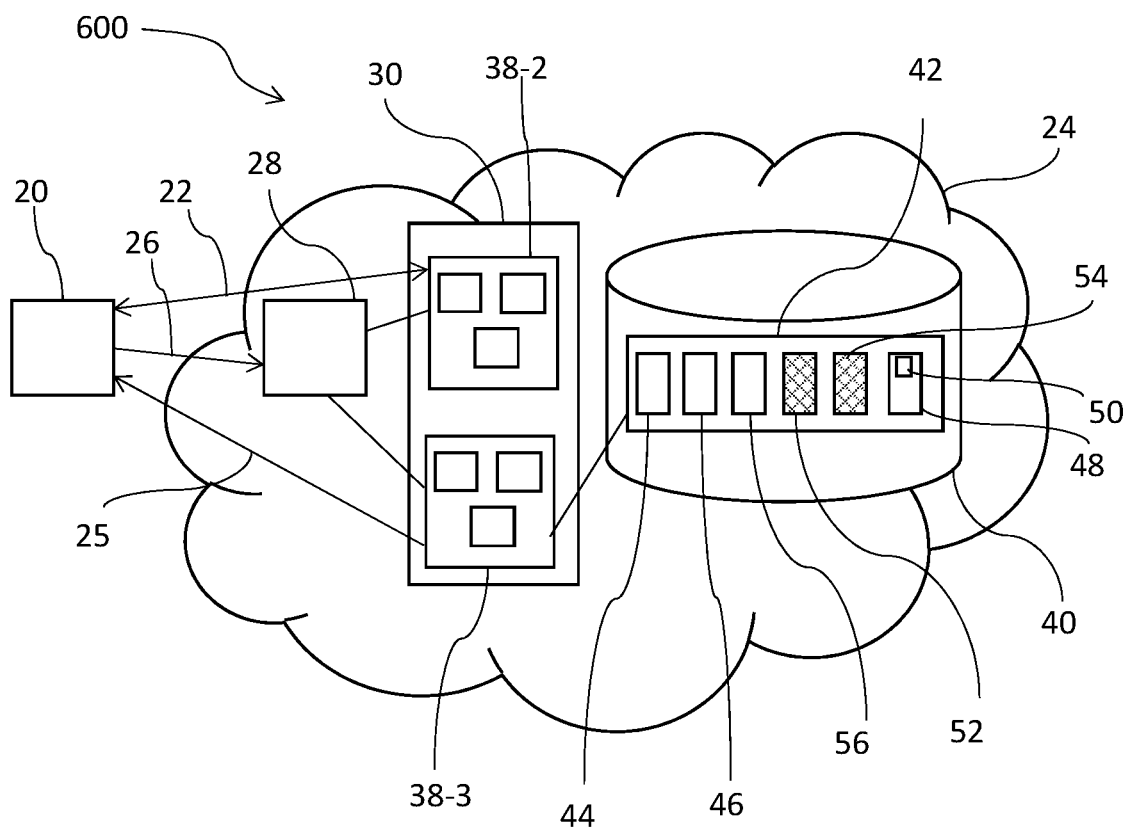
FIG. 6A illustrates an example of resetting a device connection according to the present techniques.
Figure 6B:
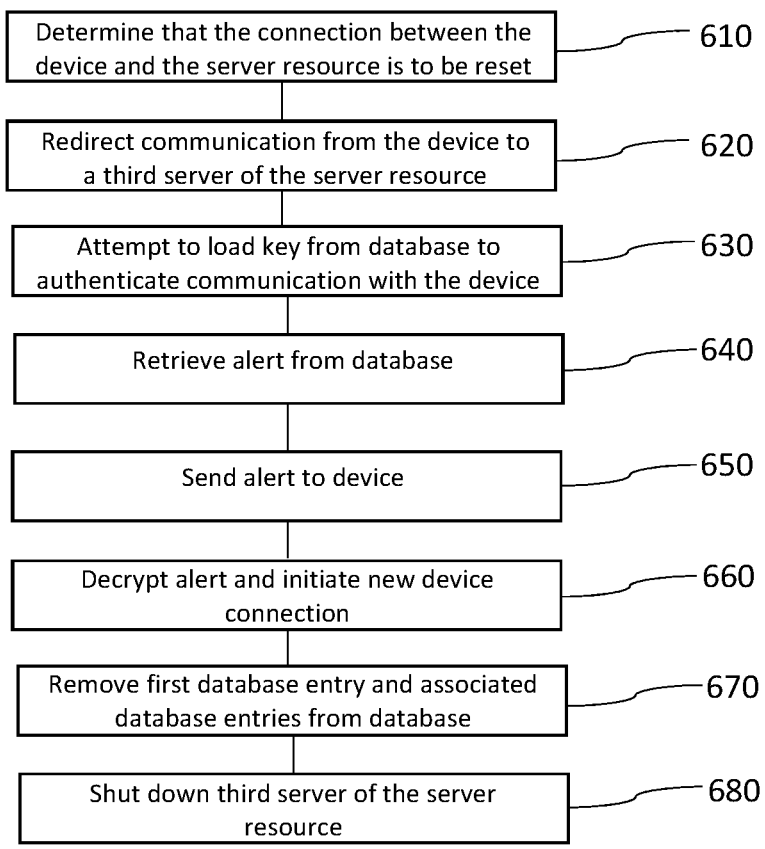
FIG. 6B illustrates a flow diagram of blocks of a method according to various examples.

In embodiments of the present invention the previously stored alert 48 can be used to recover the device 20 upon transmission or receipt of the next communication from the device 20 to the second server 38-2. This process is as described above in relation to an embodiment where the connection data is lost and/or the first server 38-1 fails, and is illustrated in FIG. 6A which illustrates an example of a device connection reset scenario 600 and FIG. 6B which illustrates a flow diagram of blocks for the device connection reset scenario 600 of FIG. 6A.

At block 610, it is determined that the connection between the device 20 and the server resource 30 is to be reset, for example by detecting failure of the second server 38-2. The detection of the failure of the second server 38-2 can be identified by, for example, a communication to the second server 38-2 failing to reach the second server 38-2. Alternatively, determining that the connection 22 between the device 20 and the server resource 30 is to be reset may comprise determining that connection data for establishing the connection between the device 20 and the second server 38-2 of the server resource 30 has been lost.

In order to restore communication with the device 20 it is necessary to access the database arrangement 40 to retrieve the previously stored alert 48. When detection of a requirement to reset the connection between the device 20 and the server resource 30 has been identified, for example by detecting loss of connection data, or detection of the failure of the second server 38-2 has been identified, the communication from the device 20 is redirected to a new server, in this case a third server 38-3 of the server resource 30, in block 620, and because the second server 38-2 is no longer available, the accessing of the database arrangement 40 is by the third server 38-3, the third server 38-3 being different from the second server 38-2.

When the third server 38-3 receives the redirected communication from the device 20, it attempts, in block 630, to load the key 52 from the database arrangement 40, which is stored in association with the first database entry 42 of the database arrangement 40, in order to authenticate communication with the device 20. Since the second server 38-2 did not shut down in a controlled manner, the key 52 is not held on the database arrangement 40, as illustrated by a crossed box in FIG. 6A, and so retrieval of such a key 52 fails. The third server 38-3 then concludes that the second server 38-2 must have shut down in an uncontrolled manner, failed in an unexpected manner, crashed, or is unavailable for some other reason.

Following failure to retrieve the key 52, the database arrangement 40 is then accessed by the third server 38-3 at block 640 to retrieve or fetch the alert 48.

Once the alert 48 is retrieved then the alert 48 is sent, via a device-sensor connection 25, to the device 20 in block 650. In particular the alert 48 is sent to the device 20 from the third server 38-3, in response to the failure of the second server 38-2.

Figure 7A:
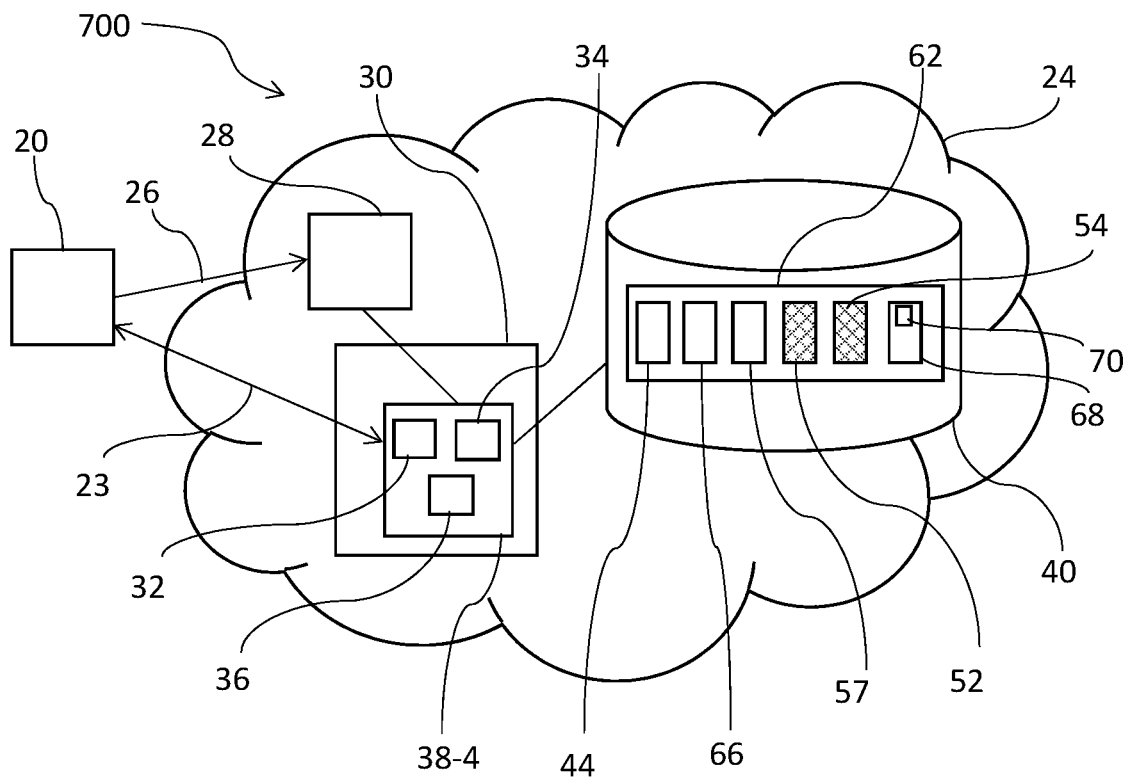
FIG. 7A illustrates an example connection restart scenario for a device according to the present techniques.

In block 660 a new device connection 23, illustrated in FIG. 7A, is started, as will be explained further below. At this time the first database entry 42 and associated database entries are removed from the database arrangement 40 in block 670 and the third server 38-3 is shut down in block 680, following the sending of the alert 48 to the device 20, from the third server 38-3. Blocks 660 and 680 may operate in parallel.

Figure 7B:
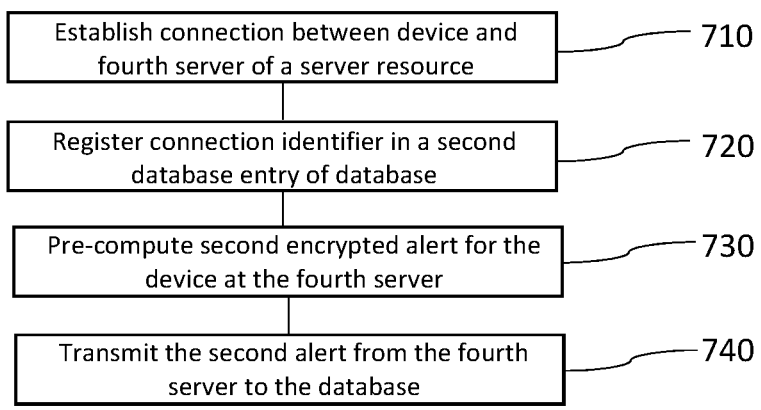
FIG. 7B illustrates a flow diagram of blocks of a method according to various examples.

In relation to block 660, the alert 48, received from the third server 38-3, is decrypted at the device 20. The initiation of the new device connection 23 is then similar to the initial connection setup described above in relation to communicating with the first server 38-1, and is illustrated in FIG. 7A, which illustrates an example connection restart scenario 700, and FIG. 7B which illustrates a flow diagram of blocks for the connection restart scenario 700 of FIG. 7A.

In particular, in response to decrypting the alert 48, a new connection 23 between the device 20 and a fourth server 38-4 of the server resource 30 is established at block 710. Then, at block 720, the device 20 and a connection identifier 66 relating to the new connection 23 between the device 20 and the fourth server 38-4 is registered in a second database entry 62 of the database arrangement 40 i.e. the fourth server 38-4 transmits data relating to the connection identifier 66 to the database arrangement 40 for storage therein.

A new encrypted alert 68, which may be a second encrypted alert 68, for the device 20 is then pre-computed at block 730, at the fourth server 38-4, the second alert 68 being provided with a pre-defined future communication sequence number 70, as noted previously in relation to the previous alert 48.

Finally, the second alert 68 is transmitted at block 740, from the fourth server 38-4, to the database arrangement 40 for storage in association with the second database entry 62 of the database arrangement 40. Communication between the device 20 and the fourth server 38-4 may then continue.

The database arrangement 40 may also store one or more of a device identifier 44 and a server identifier 57 for the fourth server 38-4. The device identifier 44 and/or the server identifier 57 may form part of the connection material. The device identifier 44 and/or server identifier 57 may be stored in association with or as part of the second database entry 62 of the database arrangement 40, and may be used to identify to which device 20 and/or server 38 the second connection identifier 66 pertains.

As will be appreciated by one skilled in the art, the present techniques may be embodied as a system, method or computer program product.

Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. The computer readable storage medium may be a non-transitory computer readable storage medium comprising code which when implemented on a processor can cause the aforementioned methods to be carried out. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

The invention claimed is:

1. A computer implemented method for managing a connection between a device and a server resource, the method comprising:
   establishing the connection between the device and a first server of the server resource;
   registering a connection identifier relating to the connection between the device and the first server in a first database entry of a database arrangement;
   pre-computing, at the first server, an encrypted alert for the device, the alert being provided with a pre-defined future communication sequence number; and
   transmitting the alert from the first server to the database arrangement for storage in association with the first database entry of the database arrangement.

2. The method according to claim 1, wherein the connection is a secure connection requiring security parameters to serve the device, optionally wherein the security parameters are generated using an authentication key exchange protocol, optionally wherein the security parameters are generated using an authentication key exchange protocol comprising datagram transport layer security.

3. The method according to claim 1, wherein the pre-defined future communication sequence number is within an upper range of possible future communication sequence numbers, optionally wherein the pre-defined future communication sequence number is the highest possible future communication sequence number, optionally wherein the pre-defined future communication sequence number is 0x00FFFFFF.

4. The method according to claim 1, comprising:
   storing the alert for the device in association with the first database entry of the database arrangement.

5. The method according to claim 1, wherein the storing of the alert for the device is carried out prior to any further communication between the first server and the device.

6. The method according to claim 1, wherein the database arrangement further stores one or more of a device identifier and a server identifier in association with the first database entry of the database arrangement.

7. The method according to claim 1, comprising:
   determining that the connection between the device and the server resource is to be reset following storing the alert for the device in the database arrangement;
   accessing the database arrangement to retrieve the alert; and
   sending the alert to the device to trigger a reset of the connection between the device and the server resource.

8. The method according to claim 7, wherein determining that the connection between the device and the server resource is to be reset comprises determining that connection data for establishing the connection between the device and the first server of the server resource has been lost.

9. The method according to claim 8, wherein the connection data comprises a key to be used in an authentication key exchange protocol when initiating communication between the device and the first server, optionally wherein the connection data comprises a message counter to track a communication sequence number for messages sent from the device.

10. The method according to claim 7, wherein the accessing of the database arrangement is by a second server, different from the first server, the method optionally comprising:
    shutting down the second server following the sending of the alert to the device; and
    removing the first database entry and associated database entries from the database arrangement.

11. The method according to claim 7, comprising:
    decrypting the alert at the device; and
    in response to decrypting the alert, establishing a connection between the device and a third server of the server resource;
    registering a connection identifier relating to the connection between the device and the third server in a second database entry of the database arrangement;
    pre-computing, at the third server, an encrypted alert for the device, the alert being provided with a pre-defined future communication sequence number; and
    transmitting the alert from the third server to the database arrangement for storage in association with the second database entry of the database arrangement.

12. The method according to claim 1, comprising:
    initiating a shutdown of the first server; and
    transmitting connection data from the first server to the database arrangement for storage in association with the first database entry of the database arrangement.

13. The method according to claim 12, wherein the connection data comprises a key to be used in an authentication key exchange protocol when initiating communication between the device and the first server, optionally wherein the connection data comprises a message counter to track a communication sequence number for messages sent from the device.

14. The method according to claim 12, comprising:
    receiving a message from the device;
    retrieving the connection data from the database arrangement; and
    establishing a connection between the device and a second server of the server resource.

15. The method according to claim 14, comprising:
    determining that the connection between the device and the second server is to be reset;
    accessing the database arrangement to retrieve the alert; and
    sending the alert to the device to trigger a reset of the connection between the device and the server resource, optionally wherein determining that the connection between the device and the second server is to be reset comprises determining that the connection data for establishing the connection between the device and the second server of the server resource has been lost.

16. The method according to claim 15, wherein the accessing of the database arrangement is by a third server, different from the second server, the method optionally comprising:
   shutting down the third server following the sending of the alert to the device; and
   removing the first database entry and associated database entries from the database arrangement.

17. The method according to claim 15, comprising:
   decrypting the alert at the device; and
   in response to decrypting the alert, establishing a connection between the device and a fourth server of the server resource;
   registering a connection identifier relating to the connection between the device and the fourth server in a second database entry of the database arrangement;
   pre-computing, at the fourth server, an encrypted alert for the device, the alert being provided with a pre-defined future communication sequence number; and
   transmitting the alert from the fourth server to the database arrangement for storage in association with the second database entry of the database arrangement.

18. A non-transitory computer readable storage medium comprising code which when implemented on a processor causes the processor to carry out the method of claim 1.

19. A server resource comprising a processor configured to:
   establish a connection to a device;
   register a connection identifier relating to the connection between the device and the server resource in a first database entry of a database arrangement;
   pre-compute an encrypted alert for the device, the alert being provided with a pre-defined future communication sequence number; and
   transmit the alert to the database arrangement for storage in association with the first database entry of the database arrangement.

20. A system comprising:
   a device;
   a server resource; and
   a database arrangement;
   wherein the system performs the method of claim 1.

* * * * *